United States Patent
Harris et al.

(10) Patent No.: US 7,716,054 B2
(45) Date of Patent: May 11, 2010

(54) ACTIVITY-WARE FOR NON-TEXTUAL OBJECTS

(75) Inventors: Jensen M. Harris, Kirkland, WA (US);
Susan T. Dumais, Kirkland, WA (US);
Richard J. Wolf, Seattle, WA (US);
Eran Megiddo, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 427 days.

(21) Appl. No.: 11/771,135

(22) Filed: Jun. 29, 2007

(65) Prior Publication Data
US 2009/0006082 A1 Jan. 1, 2009

(51) Int. Cl.
*G10L 21/00* (2006.01)
(52) U.S. Cl. .................. 704/270; 704/253; 704/254
(58) Field of Classification Search ............. 704/270, 704/260, 270.1, 251, 231, 235, 253, 254, 704/277; 348/468
See application file for complete search history.

(56) References Cited

U.S. PATENT DOCUMENTS

| | | | | |
|---|---|---|---|---|
| 6,076,059 A | * | 6/2000 | Glickman et al. | ........... 704/260 |
| 6,480,826 B2 | * | 11/2002 | Pertrushin | ................... 704/270 |
| 6,594,630 B1 | * | 7/2003 | Zlokarnik et al. | ........ 704/256.5 |
| 6,972,802 B2 | * | 12/2005 | Bray | .......................... 348/468 |
| 7,502,741 B2 | * | 3/2009 | Finke et al. | ................. 704/270 |

* cited by examiner

*Primary Examiner*—Huyen X. Vo
(74) *Attorney, Agent, or Firm*—Lee & Hayes, PLLC

(57) ABSTRACT

Providing for summarization and analysis of audio content is described herein. By way of example, an oral conversation can be analyzed, such that points of interest within the oral conversation can be identified and file locations related to such points of interest can be marked. Points of interest can be inferred based on a level of energy, e.g., excitement, pitch, tone, pace, or the like, associated with one or more speakers. Alternatively, or in addition, speaker and/or reviewer activity can form the basis for identifying points of interest within the conversation. Moreover, a compilation of the identified points of interest and portions of the original oral conversation related thereto can be assembled. As described herein, audio content can be succinctly summarized with respect to inferred and/or indicated points of interest, to facilitate an efficient and pertinent review of such content.

17 Claims, 13 Drawing Sheets

ACTIVITY-WARE FOR NON-TEXTUAL OBJECTS

BACKGROUND

Various multi-media providers offer diverse mechanisms with which to capture and/or record content. For instance, content can be captured via cameras, video cameras, audio recorders, and devices that can combine features of such recorders. Furthermore, as mechanisms for storing captured content have traversed from analog to digital realms, new paradigms for memorializing content, maintaining integrity of stored content, retrieval of such content and review of stored content have been experienced.

Recent focus has particularly been directed at review of saved content. For example, supply tools are now available for visualizing textual data, summarizing and condensing video and/or photographic data, and the like. Such tools have been useful for many educational and professional pursuits. For example, various professions require summarization and review of recorded media, such as auditory content, including, e.g., speech, conversation, musical works, and video content, including, e.g., live or simulated audio/visual events. For instance, physicians, psychiatrists and psychologists often record patient interviews to preserve information for later reference and to evaluate patient progress. Patent attorneys typically record inventor interviews so as to facilitate review of a disclosed invention while subsequently drafting a patent application. Broadcast news media is often recorded and reviewed to search for and filter conversations related to particular topics of interest. In general, along with a capacity for storing large quantities of distributed media, a need has arisen for reviewing and summarizing recorded media information.

Summarization can refer broadly to a shorter, more condensed version of some original set of information, which can preserve some meaning and context pertinent to the original set of information. Summaries of some types of information have received more attention than others. Particularly, visual and video content have been widely and persistently studied for mechanisms to identify and distinguish segments of interest. To a lesser degree, audio content has also received some attention toward facilitating review and summary of such content.

Review of audio content can be particularly useful as much information exchanged in verbal meetings can be lost. For example, while taking notes on a lecture using pen and paper, vast quantities of detail, not memorialized on such notes can be lost shortly after the lecture. Recording content from a meeting, whether face-to-face or over a remote communication platform (e.g., telephone, computer network, etc.) can be a valuable mechanism for preserving such content. However, difficulties can arise in regard to recordings as well, typically related to review of information. For example, scanning through hours of media recordings can take an amount of time commensurate with capturing the recording in the first place. Consequently, summaries that provide facilitated review of information can enhance efficiencies associated with such review.

SUMMARY

The following presents a simplified summary in order to provide a basic understanding of some aspects of the claimed subject matter. This summary is not an extensive overview. It is not intended to identify key/critical elements or to delineate the scope of the claimed subject matter. Its sole purpose is to present some concepts in a simplified form as a prelude to the more detailed description that is presented later.

The subject matter disclosed and claimed herein, in various aspects thereof, provides for identifying points of interest within oral conversations and marking file locations related to such points in order to facilitate a conversation's review. Points of interest can be identified based on a level of energy, e.g., excitement, pitch, tone, pace, or the like, associated with one or more speakers. Alternatively, or in addition, speaker and/or reviewer activity can form the basis for identifying points of interest within the conversation. In such a manner, audio content can be succinctly summarized with reference to particular points of interest, inferred or provided by a device user.

In accordance with additional aspects of the subject disclosure, a compilation of identified points of interest within audio content is provided. A content navigation component can retrieve portions of audio content within a threshold proximity to an identified point of interest. In addition, such portions can be extracted from a media file and compiled within a separate file. Furthermore, a user can indicate particular points of interest that can be saved and additional points of interest that can be discarded. As described, the disclosed subject matter can provide for a customized compilation of audio content, pertinent to the needs of a particular individual.

Further aspects of the claimed subject matter provide for analyzing and compiling diverse media types related to identified portions of audio content. A context component can identify a time and location associated with a recording device (e.g., utilizing an electronic clock and global or satellite positioning mechanism). A network search component can access a data network, such as the Internet, and determine information pertinent to the time and/or location. As an example, local weather, news, travel information, sales data, pertinent stock information, or various other data can be compiled by the networks search component and associated with identified points of interest in an audio media file. In addition, such compilation can be directed by stored user preferences. Furthermore, a compilation of various media types, including video, photographic, textual, related to the identified points of interest can be generated, along with the contextual data, to form a diverse composition of audio/visual data related to identified points of interest.

The following description and the annexed drawings set forth in detail certain illustrative aspects of the claimed subject matter. These aspects are indicative, however, of but a few of the various ways in which the principles of the claimed subject matter may be employed and the claimed subject matter is intended to include all such aspects and their equivalents. Other advantages and distinguishing features of the claimed subject matter will become apparent from the following detailed description of the claimed subject matter when considered in conjunction with the drawings.

DETAILED DESCRIPTION

Figure 1:
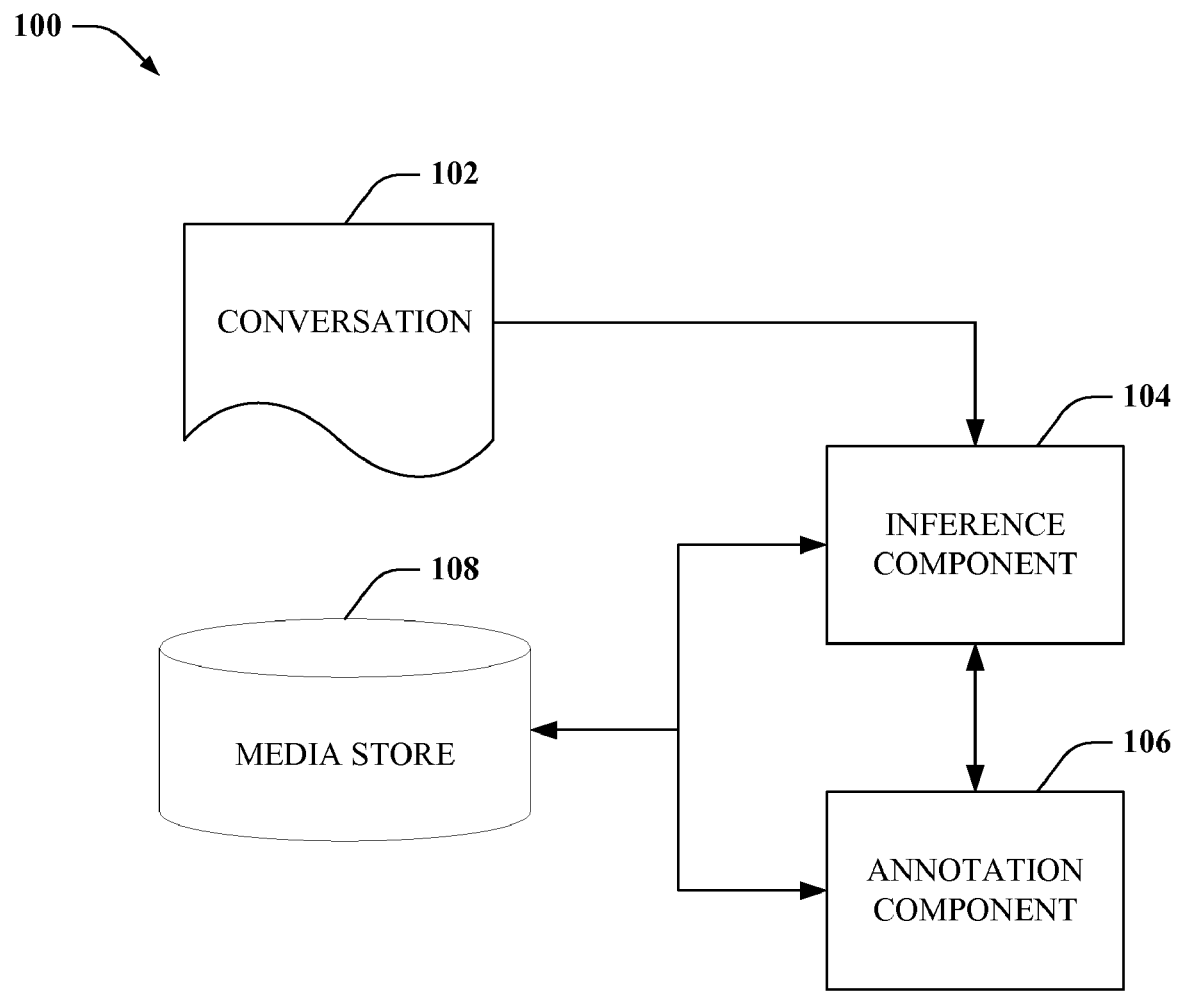
FIG. 1 illustrates a sample system that can identify and annotate points of interest in audio content according to aspects of the subject disclosure.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this application, the terms "component," "module," "system", "interface", or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. As another example, an interface can include I/O components as well as associated processor, application, and/or API components, and can be as simple as a command line or a more complex Integrated Development Environment (IDE).

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As used herein, the terms to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring to FIG. 1, a system 100 is depicted that can identify and annotate points of interest in audio content according to aspects of the subject disclosure. System 100 can receive, analyze and/or record audio content, including speech and/or an oral conversation 102. Such oral conversation 102 can further include a plurality of speakers. A point of interest can include a portion of a conversation (102) in which one or more speakers exhibits a higher than typical energy level. Additionally, a point of interest can be identified in conjunction with activity of a speaker, such as a verbal trigger (e.g., if a speaker says 'wow that's a cool idea', a point of interest can be identified).

As used herein with respect to audio analysis, the term 'energy level' is intended to include, but not be limited to, speaker volume. In addition, energy level can include excitement level, activity level, animation level, or interest level, or the like, measured by speaker(s) volume, pitch, tone, rate of speech, and a rate of change in any of the foregoing or like qualities. For instance, a rate or volume at which a speaker articulates words can indicate excitement level or a desire to express a point, and can be related to energy level. A speaker rapidly articulating words can indicate a high excitement level or a relatively intense desire to express a point. Conversely, a speaker articulating words more slowly can indicate a lower level of excitement. Changes in pitch, volume, tone, etc., and/or a frequency of such changes can also provide an indication of energy level, as used herein. Furthermore, a number of speakers speaking concurrently can also be included within an energy level determination. For example, a single person speaking can demonstrate a relatively low energy level, whereas multiple speakers speaking at once, in effect talking over each other, can demonstrate a higher energy level, as used herein. Consequently, energy level is to be construed as including all of the foregoing, and not limited to just speaker volume.

Specifically, an inference component 104 can determine a point of interest based at least in part upon identification of an energy level in an oral conversation 106. Such point of interest can be represented by an energy level higher than a threshold energy level, for instance. Alternatively, or in addition, the threshold energy level identifying a point of interest can be established by a default within system 100, or a user defined parameter (e.g., a more detailed discussion of user preferences is discussed in regard to FIG. 4, infra), or a suitable combination of both.

Inference component 104 can determine an energy level within oral conversation 102 at least in part based on measurable auditory indications. For example, a pitch of a speaker's voice, volume of a speaker's voice, voice tone, length and frequency of pauses between words, a number of speakers speaking simultaneously, or like indication can be utilized to determine the energy level in the oral conversation. Non-verbal auditory indications can also be utilized, such as foot tapping, or hand tapping, or a speaker banging a desk, table, or the like.

In addition, inference component 102 can continuously monitor an oral conversation in order to identify points of interest as the oral conversation progresses. Specifically, an energy level can be determined as part of real-time or near real-time measurement and calculation (e.g., of auditory indications, as described above) that can determine contemporaneous energy levels and changes in such levels. As a specific example, measurements of speaker pitch, volume, tone, pause frequency and/or number of speakers can be taken every second. It should be appreciated that equipment for measuring auditory indicators such as that described above can take measurements much more frequently (e.g., thousands of times per second, or more frequent), or much more slowly (e.g., once every 10 or 20 seconds, or less frequent) as suitable. Furthermore, measurement frequency can be dynamically adjusted in accord with aspects of the subject disclosure, based on frequency of change in measured energy level, or like factor, for instance.

System 100 can also identify a point of interest within an oral conversation 102 based on speaker activity. A verbal cue, such as 'great idea', or the like, can form the basis for a point of interest. Optionally, a loud or sharp noise can trigger identification of a point of interest, such as banging on a desk, a speaker clapping their hands, or similar event. Predetermined auditory indications can also motivate inference component 104 to identify a point of interest. For example, a predetermined word or phrase such as 'record point of interest', or the like, can be utilized. As another example, snapping one's fingers can trigger such a point, or clapping hands, tapping a foot, or any suitable auditory trigger known in the art, or made known to one of skill in the art by way of the embodiments articulated herein.

It should be appreciated that inference component 104 can also identify points of interest for more than a single individual. An energy level associated with one or more particular speakers can trigger identification of points of interest particular to those speakers, for example. Furthermore, one or more distinct activity triggers (e.g., verbal cue, snapping finger, clapping hand, tapping foot, press of a button on a device, a show of hands or other somatic indication of approval or dissent, and/or a number of such hands, etc.) associated with a particular speaker(s) can be utilized to generate a point of interest particular to the speaker(s). As a more specific example, 5 speakers can each record an auditory trigger and associate the trigger with their name, and store their name and associated trigger on one or more components of system 100 (e.g., inference component 104, annotation component 106, media store 108 etc.). If inference component 104 detects a trigger associated with a speaker, a point of interest can be generated and also associated with the speaker.

Inference component 104 can identify points of interest upon review of an audio and/or visual recording as well as during the initial recording. For instance, implicit or explicit activity of one or more reviewers can be utilized to identify points of interest (e.g., particular to the one or more reviewers, and/or common to multiple reviewers) within the reviewed recording. As an example, points of interest can be generated implicitly based on actions such as writing notes, biometric indicators/actions, discussion amongst the reviewers and an energy level, as defined herein, associated therewith, or the like, upon review of content. As a further example, points of interest can be identified explicitly based on a predetermined trigger (e.g., verbal word/phrase, somatic gesture, and or sound, such as snapping finger, tapping foot, etc.) or based on marking, voting, show of hands, or the like.

Furthermore, the inference component 104 can identify points of interest based on implicit or explicit patterns of usage. For instance, one or more implicit activities, as defined herein, typically exhibited by a person during a conversation, discussion, lecture, or the like, or during review of such conversation, etc. Additionally, explicit actions previously detected, or established as a predetermined trigger associated with an individual, can be utilized to identify points of interest with respect to current content.

In addition to the foregoing, inference component 104 can identify a point of interest from implicit or explicit non-auditory cues related to the oral conversation. For instance, a video recording component (not shown) can capture video associated with the conversation or with a review of the conversation (e.g., a review can include studying recorded lesson notes, reviewing a recorded conversation, analyzing an audio recording for content, or the like). If a particular visual event occurs, such as measurable level of movement, a particular somatic gesture, or the like, inference component 104 can identify a point of interest at a correlated point in the oral conversation. Alternatively, or in addition, explicit annotations by means of marking, voting, note taking (e.g., an act of writing commensurate with a point in an audio recording) or the like (e.g., show of hands, pressing a button on a device, such as a cell phone, remote controller, wireless device, or the like) can be utilized to identify points of interest. Furthermore, other implicit measures of engagement via interaction patterns during initial recording or subsequent review can be used to identify points of interest.

After (or, e.g., contemporaneous with) identifying a point of interest, system 100 can label a portion of the conversation 102 where the point of interest occurred. Specifically, an annotation component 106 can mark an audio file at a location associated with the point of interest. The marked audio file can be stored, for example, at a media store 108. A location marked by annotation component 106 can be referenced quickly (e.g., by a playback device or summarization component such as that depicted at FIG., infra) for review at a later time. Moreover, annotation component 108 can provide one or more distinct marks for one or more speakers and/or users of system 100 (e.g., which could include a recording device, such as but not limited to a hand-held audio or audio/visual recorder, a camera, camcorder, or the like). Furthermore, annotation component 106 can mark points of interest inferred by inference component 104 (e.g., from a measured energy level) in a distinct manner as opposed to points of interest identified in relation to speaker activity (e.g., such as a somatic gesture, verbal or non-verbal auditory trigger, or the like).

Figure 4:
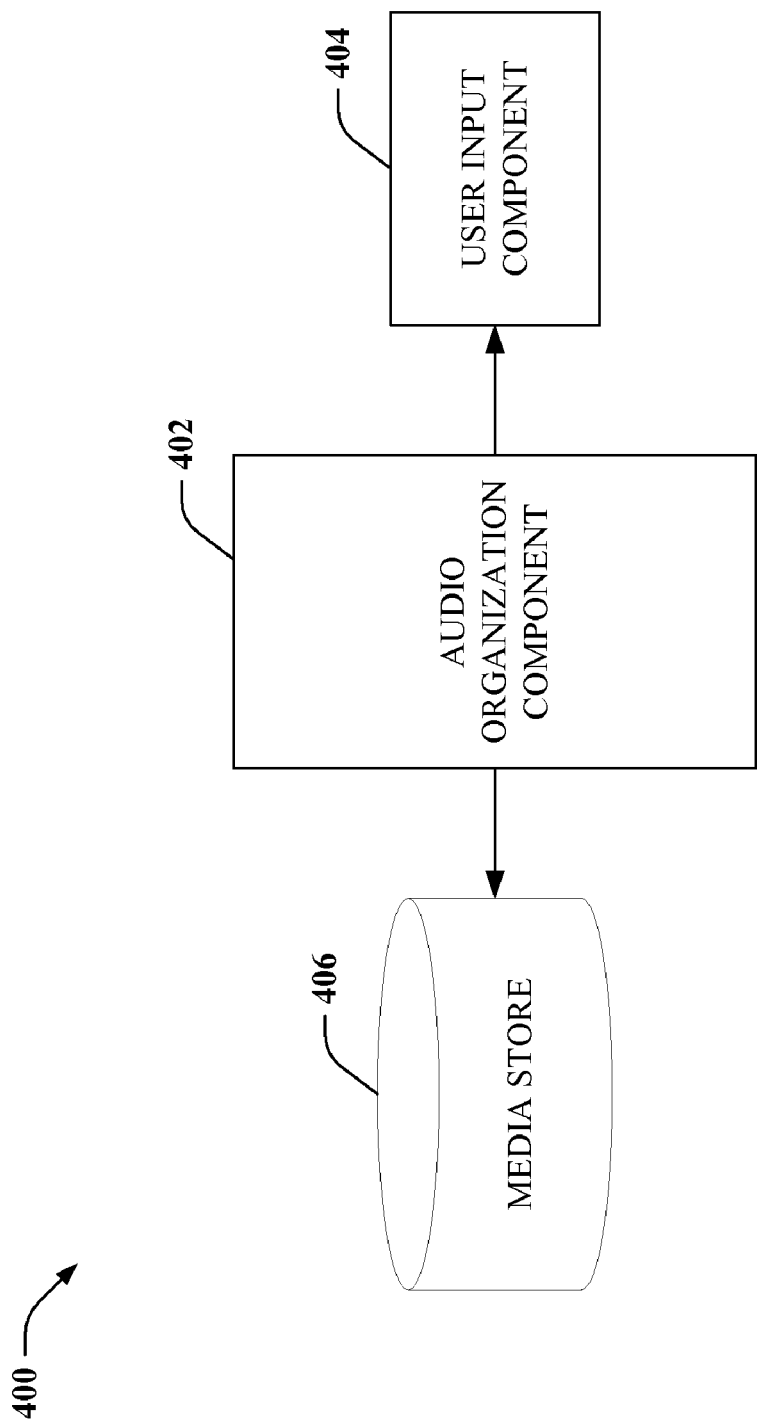
FIG. 4 depicts an exemplary system that can store and utilize user preferences for providing summary and review of audio content.

Annotation component 106 can also mark an audio file in a manner commensurate with user preferences (e.g., as discussed in regard to FIG. 4, infra). For example, a user preference can indicate a particular type of mark to associate with a particular speaker, with a particular point of interest, or a size of a portion of a media file to associate with a point of interest (e.g., measured in time, such as a 30 second portion, or in size, such as a 50 kilobyte portion, etc.) As described, system 100 can facilitate summarization and review of audio content by automatic and/or user assisted identification and labeling of points of interest associated with such content.

In accordance with aspects of the subject disclosure, it should be appreciated that media store 108 can include non-volatile memory, such as read only memory (ROM), programmable ROM (PROM), electrically programmable ROM (EPROM), electrically erasable ROM (EEPROM), or flash memory, volatile memory including random access memory (RAM), such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, media store 108 can include removable/non-removable, volatile/non-volatile computer storage media, such as devices like a magnetic disk drive, floppy disk drive, tape drive, Jaz drive, Zip drive, LS-100 drive, flash memory card, or memory stick. In addition, media store 108 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM).

Figure 2:
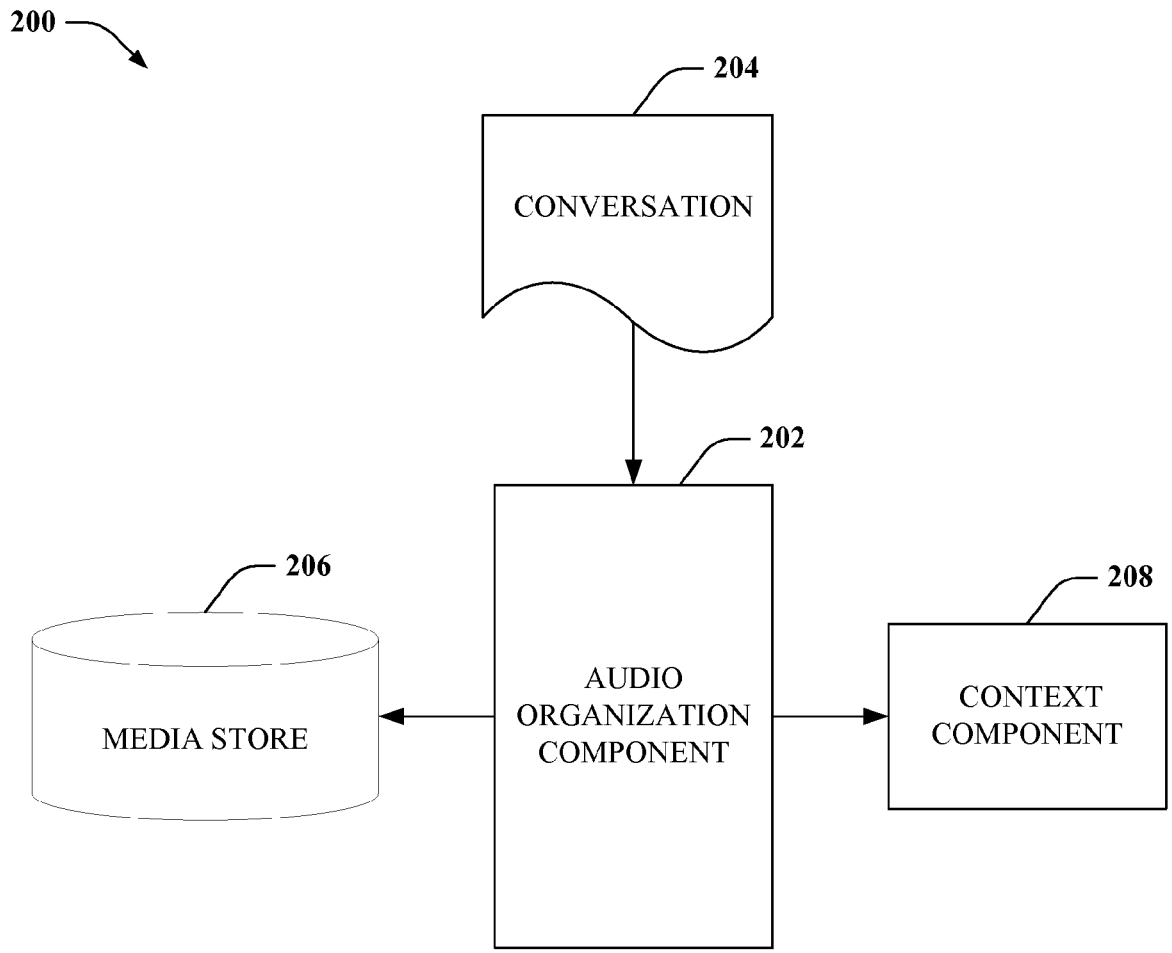
FIG. 2 depicts a system that can provide relevant context for a summary of audio content.

FIG. 2 depicts a system 200 that can provide relevant context for a summary of audio content. Specifically, audio organization component 202 can receive, analyze, and/or record audio content, including an oral conversation 204. Furthermore, such component 202 can determine one or more points of interest in the oral conversation 204 based on speaker(s) energy level and/or based on speaker activity. Additionally, audio organization component 202 can mark an audio media file at one or more locations associated with the identified points of interest. Moreover, a saved version of the conversation 204 including locations marked by the audio organization component 202 can be stored at media store 206.

In addition, system 200 can store context related to an oral conversation 204 at media store 206. The context can be included within the audio media file, discussed above, or in a separate file related to such media file. Additionally, the context can be provided by a context component 208, that can determine a time and/or a location associated with the oral conversation 204. More specifically, context component 208 can reference a time measurement device (e.g., electronic clock) associated with a recording device, such as audio organization component 202, or a data store, such as media store 206, and capture one or more times pertinent to the oral conversation. For instance, a time at which the conversation began and ended can be determined by context component and associated with oral conversation 204 and/or media store 206 (e.g., in a manner related to the audio media file stored thereon). Moreover, a date and time sequence can be recorded by context component 208. Such date and time sequence can be included within/appended to the audio media file, and provide a date and time of recording for oral conversation 204 and various portions thereof. Such data and time can be displayed during playback and/or retrieval of portions of the audio media file. Additionally, context component can record a time that a location of the audio media file is marked by audio organization component 202 and associate such time with the file and/or the marked portion of the file. In such a manner, system 200 can provide time and data information associated with a conversation and/or review of the conversation.

In addition to the foregoing, context component 208 can also provide location information related to an oral conversation 204. For example, a global position system (GPS) or satellite position system (SPS) included, for instance, on a recording device (e.g., audio organization component 202) can be referenced to determine location information related to capture and/or analysis of oral conversation 204. Specifically, a location where a conversation took place can be identified and included within or in a file related to an audio media file stored at media store 206. Additionally, one or more locations associated with an analysis, summarization, and/or review of audio content (204) can also be identified and included/stored with such content. In such a manner, contextual information can be provided to facilitate recollection of events associated and potentially pertinent with the content (204).

As a specific, non-limiting example, system 200 can record and/or analyze a monologue or dialogue (e.g., a discussion) about a particular painting of interest to one or more speakers. Typically, if no context associated with the recording is captured and preserved, a speaker may lose track of where the discussion occurred, and what it was in relation to. For example, a discussion may include topics that were on a speaker's mind at the moment of discussion that provided context and meaning for aspects of the discussion itself. Additionally, such aspects could lose meaning, or become nonsensical, without the context. Moreover, if over time the context is forgotten, and not specifically articulated within the discussion, the meaning provided by the context could be lost.

To help remedy the foregoing problem, system 200 can provide additional information, such as date, time, and location pertaining to a discussion, to enable recollection of non-articulated (and, e.g., non-recorded) context. For instance, system 200 can store a determination that the discussion took place in Seattle at 12:35 pm PST, December 1 of a particular year. Additionally, a place of interest associated with location information determined by context component 208 (e.g., a public museum) can be included. Such information can assist in recalling a context that was on a speaker's mind when a discussion was recorded, and assist the speaker in recalling meaning not specifically articulated in the discussion. In such a manner, system 200 can facilitate summarization and review of audio content, and provide additional context therewith.

Figure 3:
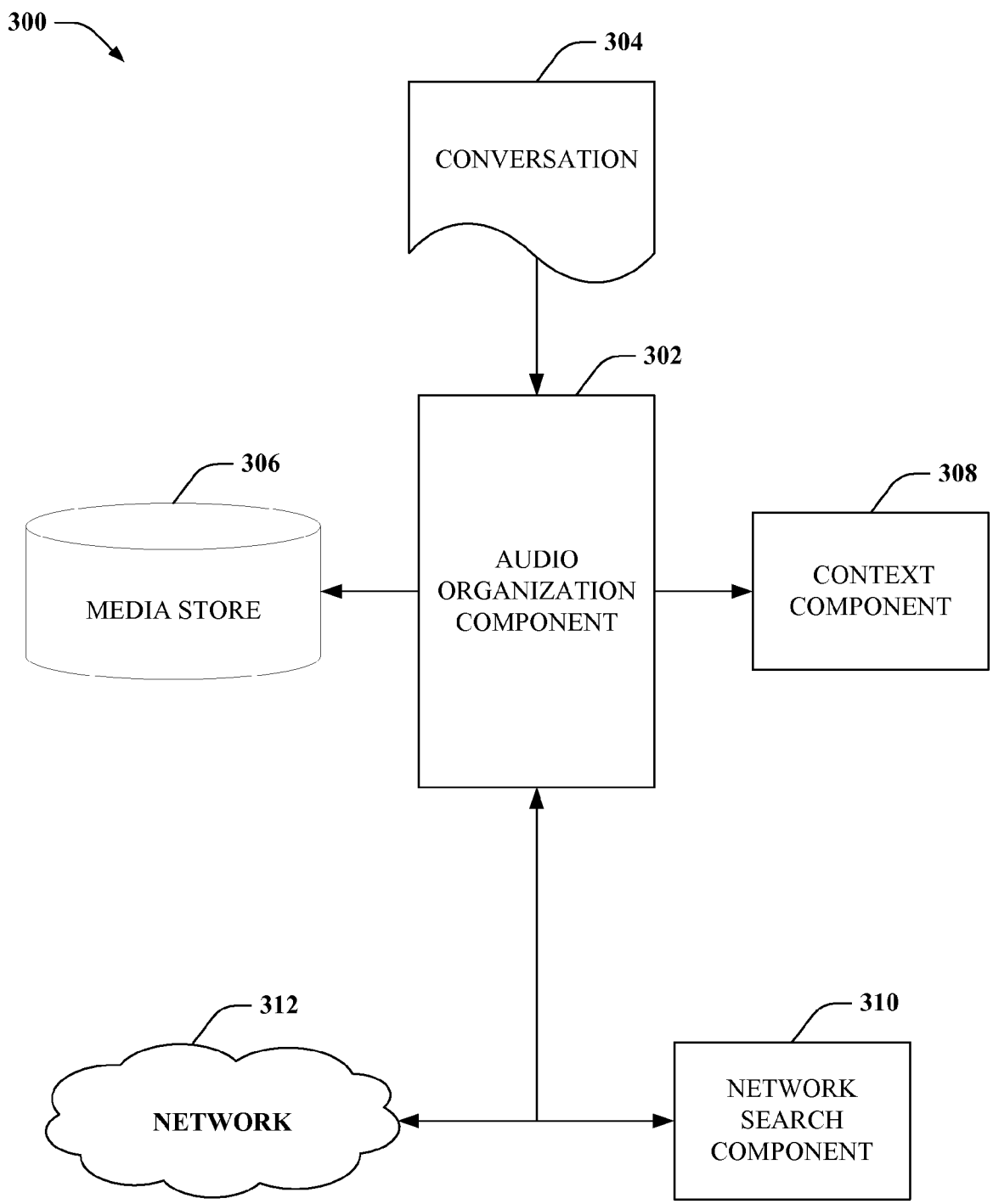
FIG. 3 illustrates an example system that can search a remote network for data pertinent to identified points of interest in accord with aspects of the subject disclosure.

FIG. 3 illustrates an example system 300 that can search a remote network for data pertinent to identified points of interest in accord with aspects of the subject disclosure. Audio organization component 302 can receive and/or analyze audio content (304) to identify and label points of interest therein. A file containing the labeled points of interest can be stored within media store 306. In addition, a context component 308 can determine time and/or location information associated with recording of the audio content and/or review/ labeling of such content. Such time and location information can be included as part of the file or in a separate file associated therewith System 300 can also obtain information from one or more communication networks (312) to identify additional contextual information associated with audio content (304) and/or recording/analysis thereof. Network search component 310 can access a remote network 312, and perform searching and filtering functions on components of network 312. For instance, one or more data servers (not shown) associated with network 312 can be accessed. Such data servers can include powerful search engines that can rapidly access and filter data in relation to specified search criteria. Specifically, search criteria can be included by network search component 310 related to time and/or location information generated by context component 308. In addition, network search component 310 can access conversation 304 or a related data filed stored at media store 306, to extract additional search criteria associated with the conversation 204.

As a non-limiting example, suppose conversation 304 is related to artwork on display at The Louvre Museum in Paris. Network search component can obtain information from the discussion (e.g., keywords utilized within conversation 304, such as a discussion of particular art objects, or the like) as well as time, date and location information from context component 308. Utilizing such information, network search component 310 can access a data network 312 (or, e.g., components thereof such as search engines, servers, databases, and the like) such as the Internet to identify additional contextual information related to conversation 304. For instance, weather-related information can be identified and retrieved. More specifically, network search component 310 can find the temperature, precipitation level, humidity, degree of sunshine, wind, or other suitable data related to weather, in Paris near The Louvre Museum on a particular day associated with conversation 304. In addition, network search component can determine other data related to particular objects of art (e.g., discussed in conversation 304) appearing in local, regional, or global news, or the like. Similarly, related data can include information about people associated with the conversation. Moreover, travel information, political news, financial news, or any suitable combination thereof or of the like, related to the conversation, a topic discussed, a speaker(s) or reviewer(s) involved, or the like, can be determined by network search component 310 via network 312, in a manner articulated herein or known in the art.

Information determined by network search component 310 can be included within an audio media file containing conversation 304 and/or an analysis/summary thereof (e.g., a summary including marked portions of interest as discussed herein). Such information can be included as metadata, or like type of extended file information, for instance. Alternatively, or in addition, information gathered by network search component 310 can be stored in a separate but related file on media store 306 or an associated storage device. It should be appreciated that not all information pertinent to audio content 304 and available on a network 312 such as the Internet or a large corporate intranet, or the like, can be specifically articulated as embodiments herein. However, such information deemed pertinent to one of skill in the art is incorporated within the subject specification. As described, system 300 can access powerful network search engines in order to identify contextual information associated with audio content, and store such information in conjunction with a summary/review of the content. Consequently, system 300 can facilitate recollection speaker meaning associated with an oral conversation 304 via such contextual information.

FIG. 4 depicts an exemplary system 400 that can store and utilize user preferences in association with providing summary and review of audio content. Specifically, audio organization component 402 can identify points of interest within audio content (not shown) and label portions of a file associated with such content that are proximate the points of interest. Such a file can be maintained within a media store 406, for instance. In addition, audio organization component 402 can record and/or analyze audio content, identify points of interest, and label such points of interest in accord with user specified preferences.

In addition to the foregoing system 400 can facilitate customized summarization of audio content in accord with aspects of the subject innovation. More specifically, user input component 404 can store one or more user profiles associated with one or more users of a device (402) or speakers within a conversation (not shown). A user profile can indicate various defaults in conjunction with a particular user's preferences. For instance, a user can specify a preferred mechanism for analyzing audio content and identifying points of interest. More specifically, user input component 402 can store a default tone, pitch, volume, rate of speaking, frequency and duration of pauses, or the like in order to establish a threshold energy level associated with the speaker. Subsequently, audio organization component 402 can utilize such default threshold energy level in order to infer points of interest within audio content involving the speaker (e.g., as discussed in more detail at FIG. 1, supra).

User input component 404 can also assist a user in establishing user-specific activities associated with identifying points of interest. As an example, a user can record a particular verbal trigger, such as 'cool idea', that audio organization component can utilize to identify an activity-based trigger for the user. The verbal trigger can be something the user typically does when encountered with an interesting idea, thought, or topic of discussion. Additionally, non-verbal triggers can be included, such as a snap of a finger, clapping of hands, clucking of tongue, tapping of fingers, press of a button on a device (e.g., a cell phone in radio frequency (RF) communication with system 400, such as via a Bluetooth-type mechanism) or any suitable combination of these or like triggers. Such non-verbal triggers can also be associated with a user's preferred activity-based point of interest triggers. Consequently, a user/speaker can customize a mechanism in which points of interest can be identified by the user/speaker activity.

In accord with additional aspects of the subject disclosure, system 400 can include user preferences related to bookmarking portions of an audio file. For example, a user can define a particular bookmark to be associated with the user. Any point of interest, either inferred or triggered for instance, related to the user can be labeled on an audio media file utilizing the particular trigger. For instance, the label can include the user/speaker's name, or other information unique to the speaker. Alternatively, or in addition, a summary display device (not depicted) providing a visual review of audio content and bookmarked portions, can display a user's bookmark in a particular color, font, size, shape, or like distinguishing characteristic. In such a manner, system 400 can facilitate customized summary, analysis and review of audio content by incorporating preferences established by a specific user.

Figure 5:
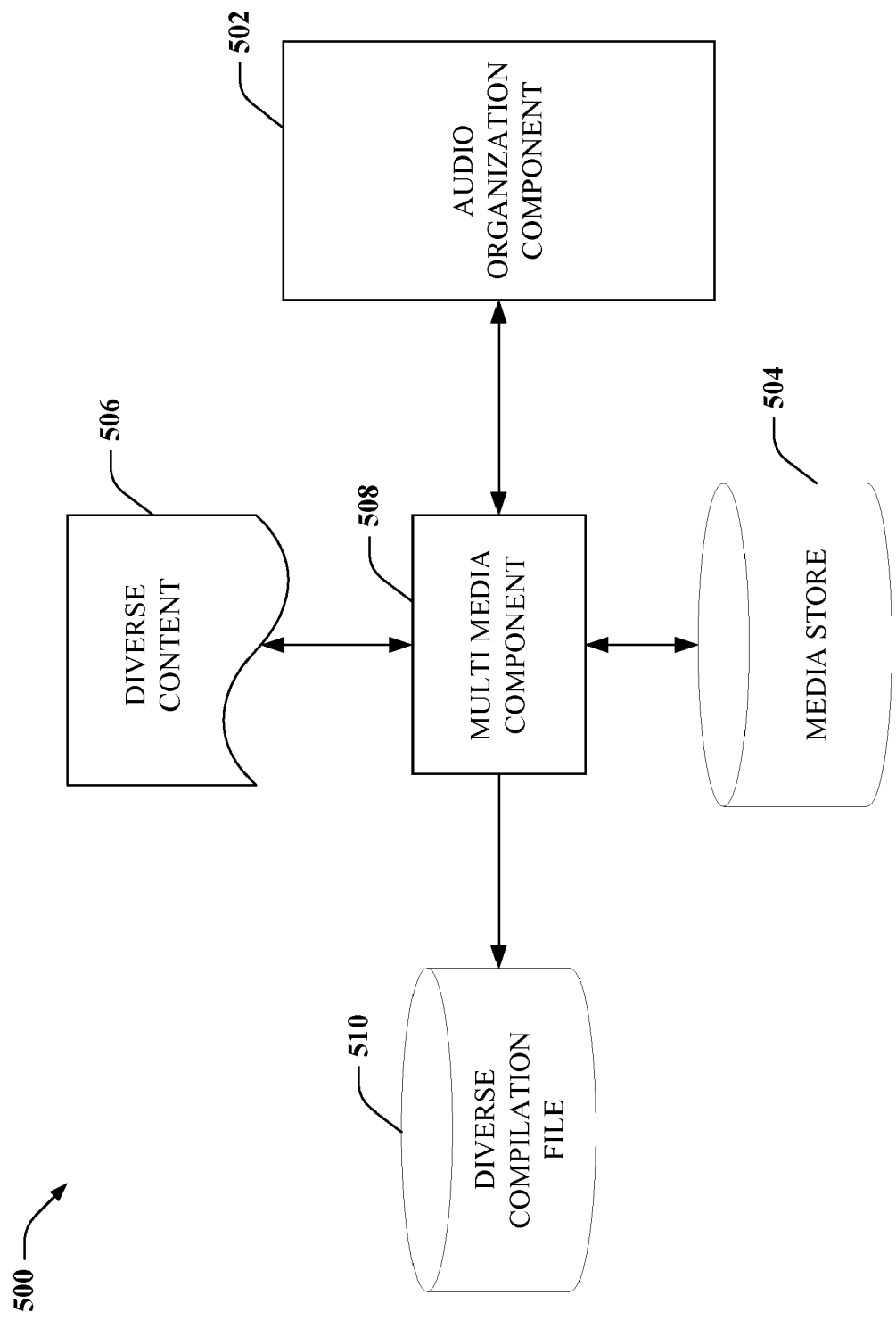
FIG. 5 illustrates an example system that compiles pertinent portions of diverse media related to points of interest of an oral conversation in accord with the subject disclosure.

FIG. 5 illustrates an example system 500 that compiles pertinent portions of diverse media related to points of interest of an oral conversation. As discussed herein, such points of interest can be identified by audio organization component 502 according to speaker(s) energy level, speaker activity, and/or particular preferences of one or more speakers. Additionally, a point of interest can be labeled within a portion of an audio media file in a location associated with the point of interest. Such media file can be stored at media store 504.

In accordance with particular aspects of the claimed subject matter, system 500 can identify portions of diverse content 506 related to points of interest identified by audio organization component 502, and associate such portions of diverse content 506 with an audio media file containing labeled audio content as disclosed herein. Multi-media component 508 can receive and analyze portions of diverse media types (506). For instance, diverse media 506 can include photographic media, textual media, video media, as well as additional types of audio media including music, lyrics, and the like. Additionally, multi media component 508 can determine portions of diverse content related to a point of interest identified by audio organization component 502, and associate such diverse content and audio content (e.g., in a diverse compilation file 510).

For example, if audio content contains a discussion of a song title, multi media component 508 can search diverse content 506 (e.g., obtained and provided by network search component 306, or like component) and identify a sound clip related to the song title (e.g., containing all or a subset of the song). Additionally, multi media component 508 can identify a photograph of performers associated with the song title, and/or a video clip of a television interview, music video, news discussion, or the like associated with the song title. Moreover, multi-media content 508 associate such portions of diverse media types associated with the point of interest. For example, one or more files containing such diverse media (506) can be linked to a bookmarked portion of an audio file containing the audio content (stored at 504 for instance). Additionally, multi-media component 508 can extract associated portions of the diverse media types, including the audio content, and compile a diverse compilation file 510.

Diverse compilation file 510 can be a summary of all points of interest identified with respect to a particular audio content (not depicted), and various forms of media content related to such points of interest. As such, diverse compilation file 510 can be a pseudo-electronic scrapbook of particular audio points of interest, containing related video, photographic, musical etc., media associated with those points of interest and providing rich, diverse, and varied context therewith. In addition, further contextual information can be included within diverse compilation file 510, including time and/or location information (e.g., as provided by context component 208 discussed in more detail at FIG. 2, supra) and local, regional, or global news information (e.g., provided by network search component 310, discussed in more detail at FIG. 3, supra) pertaining to the points of interest.

It should be appreciated that diverse compilation file 510 can be incorporated within a presentation application, suitable for compiling and displaying/playing varied media types. For example, a presentation application, which can include a PowerPoint-type application or like application, for instance, can be employed to compile diverse types of media related to audio content and identified points of interest therein. Furthermore, such compilation (510) can be done via remote network connection, utilizing a plurality of network storage devices, servers, or the like (e.g., in conjunction with network search component 308). Additionally, multi-media component 508 can compile diverse media related to audio content in accord with predetermined, suitable user preferences. In such a manner as described above, system 500 can compile rich and diverse information related to one or more portions of audio content in accord with aspects of the subject disclosure.

Figure 6:
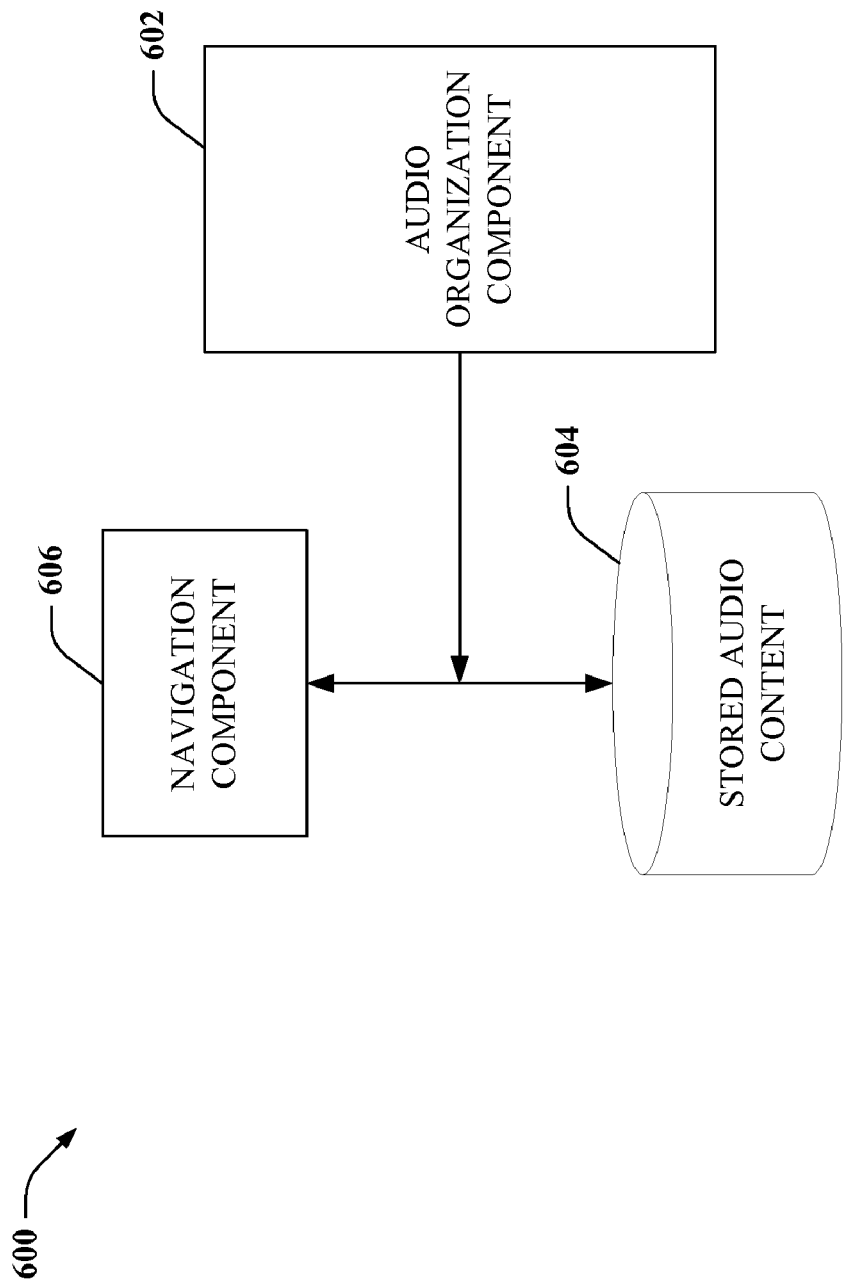
FIG. 6 depicts a sample system that can facilitate review of stored content in accordance with the disclosed subject matter.

FIG. 6 depicts a sample system 600 that can facilitate review of stored content in accordance with the disclosed subject matter. As described herein, audio organization component 602 can receive, record, and/or analyze audio content, define points of interest related to one or more speakers, and label an associated data file to facilitate retrieval and review of such points of interest. Additionally, such a data file can be stored within media store 604, as described herein.

In addition to the foregoing, system 600 can search, locate, retrieve and playback stored portions of audio content. Specifically, navigation component 606 can retrieve a portion of an audio file proximate to a marked location. Consequently, any suitable location marked by audio organization component 602 can be retrieved by navigation component 606 for subsequent review. Additionally, navigation component 606 can display (e.g., on a user interface display of a device) an indication of custom bookmarks or custom generated points of interest (e.g., in accord with user specified preferences, discussed in more detail at FIG. 4, supra). Furthermore, navigation component 606 can skip from one bookmarked location to another, fast forward through stored content (604), rewind through such stored content (604), recall bookmarks associated with one or more specified users, and the like.

For instance, navigation component 606 can retrieve all bookmarked points of interest related to a first speaker. In addition, navigation component 606 can play back portions of the bookmarked content. Optionally, navigation component 606 can also display, play or present associated media types related to various points of interest identified and stored by system 600 (e.g., compiled by a multi-media component 508, as discussed above). Consequently, system 600 can facilitate quick, efficient and customized review of audio content stored in accord with particular embodiments described herein.

Figure 7:
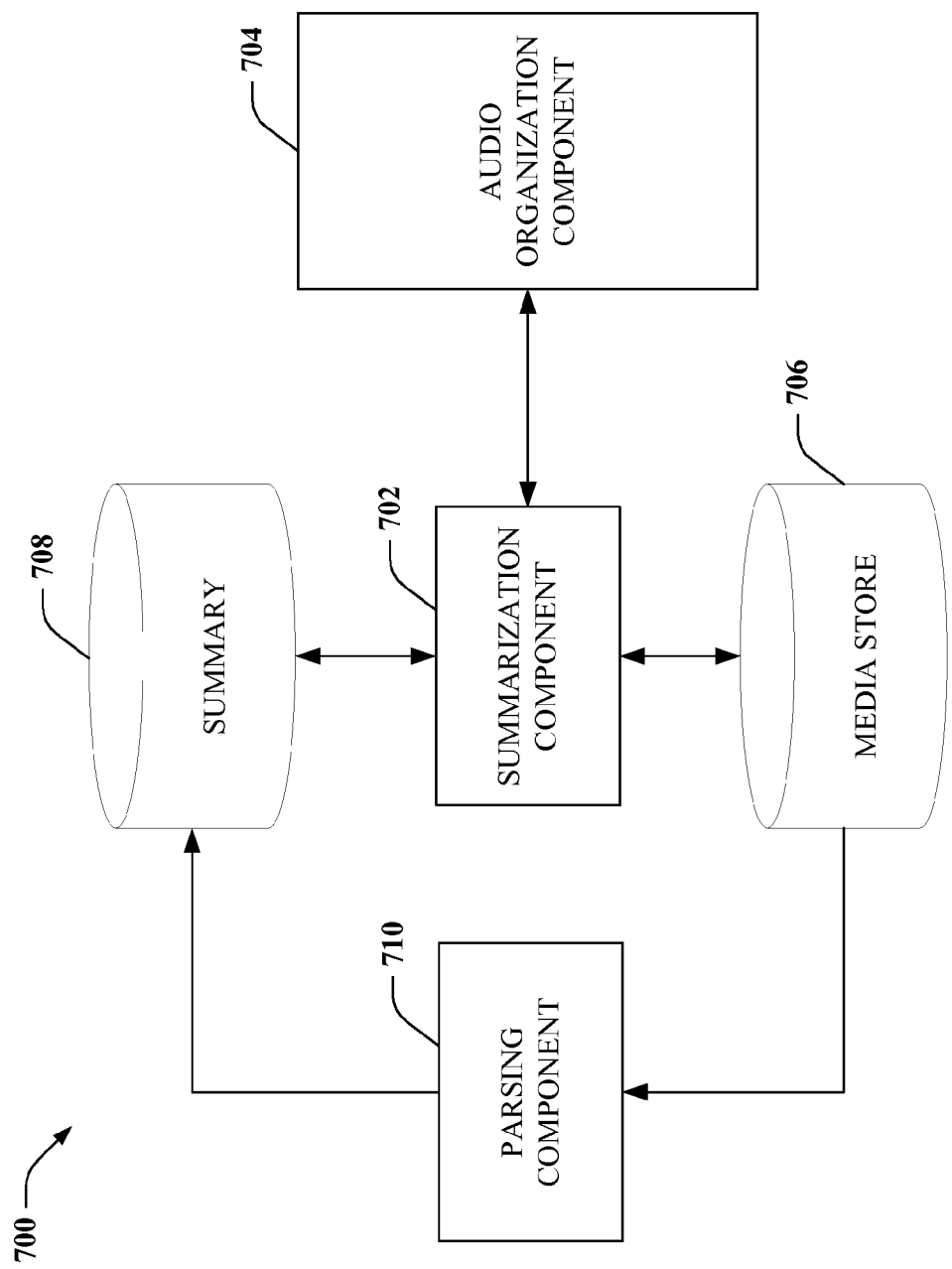
FIG. 7 illustrates an example system that summarizes pertinent points of interest related to stored audio media.

FIG. 7 illustrates an example system 700 that summarizes pertinent points of interest related to stored audio media. System 700 can include an audio organization component 704 that analyzes, records and/or plays audio content (e.g., an oral conversation), generates points of interest as discussed herein, and marks a portion of an audio media file in locations associated with the points of interest. Additionally, a summarization component 702 can generate a summary of an oral conversation by compiling portions of the audio media file (stored at 706) that are in a threshold proximity to one or more locations marked by the audio organization component 704 (or, e.g., by annotation component 106, as discussed at FIG. 1, supra). Such threshold proximity can be established as a default, calculated by summarization component 702 as a function of relevance to the point of interest, and/or established within a user preferences file (e.g., as discussed at FIG. 4, supra).

Summarization component 702 can access an audio media file stored at media store 704. A point of interest marked on the media file can be identified by summarization component 704. For example, such point of interest can be marked via metadata or like extended information associated with the file by audio organization component 704. Such metadata, or the like, can be recognized by summarization component 702 to identify a marked point of interest. Once marked points of interest are identified, summarization component 702 can compile a list of such points and locations, and extract portions of the audio media file that are within a threshold proximity thereto. For example, portions of the audio media file 15 seconds prior and 15 seconds after a marked point of interest can be extracted. Alternatively, or in addition, portions can be identified by data size (e.g., 30 kilobytes prior and after a marked file location), or can be determined as a function of relevance to the point of interest. It should be appreciated that like mechanisms for identifying an appropriate size portion of an audio file, known in the art or made known to one of skill in the art by way of the context provided herein, are incorporated into the subject disclosure.

As a more specific example, summarization component 702 can automatically determine an appropriate size portion (e.g., to determine how much of a file to extract for summary 708) as a function of relevancy to the marked point of interest. Specifically, summarization component 702 can analyze a first portion of an audio media file within a first proximity to a marked point of interest (e.g., within a certain time, data size, or the like). The first portion can be translated into text, and a first set of keywords, representative of such first translated portion, can be extracted from the translated text. In addition, portions of the audio media file within a smaller, second threshold proximity to the marked point of interest (e.g., a fraction of the size of the first marked portion) can be analyzed and keywords relevant to such smaller portion can be extracted. Subsequently, summarization component 702 can compare relevancy of keywords within the first portion to keywords within the second portion. A determination can then be made as to a point where relevancy of keywords within the second portions drops below a default relevancy factor (e.g., established with respect to keywords of the first portion). A size of the first portion can be limited to the point where extracted keywords fall below the relevancy factor. Content within the limited portion can be extracted from the audio media file and incorporated into the summary 708. Other content can be ignored by system 700, or discarded as discussed below.

In addition, system 700 can discard portions of an audio media file contained within media store 704 in order to preserve free memory space. Parsing component 710 can analyze the audio media file and compare it to the summary 708 generated by summarization component 702. Portions of the audio media file that are not extracted by the summarization component and included within summary 708 can be discarded by parsing component 710. Furthermore, parsing component 710 can be toggled on and/or off by a user preference file, a button on a device, or like mechanism. When toggled off, no data is discarded by system 700. In such a manner, system 700 can automatically free up stored memory that is not related to identified points of interest, if a device user so desires.

The aforementioned systems have been described with respect to interaction between several components. It should be appreciated that such systems and components can include those components or sub-components specified therein, some of the specified components or sub-components, and/or additional components. For example, a system could include inference component 104, annotation component 106, network search component 310, and network 312, or a different combination of these and other components. Sub-components could also be implemented as components communicatively coupled to other components rather than included within parent components. Additionally, it should be noted that one or more components may be combined into a single component providing aggregate functionality. For instance, summarization component 702 can include parsing component 710, or vice versa, to facilitate compilation of a pertinent summary and discarding of non-pertinent information via a single component. The components may also interact with one or more other components not specifically described herein but known by those of skill in the art.

Furthermore, as will be appreciated, various portions of the disclosed systems above and methods below may include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, and in addition to that already described herein, can automate certain mechanisms or processes performed thereby to make portions of the systems and methods more adaptive as well as efficient and intelligent.

In view of the exemplary systems described supra, methodologies that may be implemented in accordance with the disclosed subject matter will be better appreciated with reference to the flow charts of FIGS. 8-11. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

Additionally, it should be further appreciated that the methodologies disclosed hereinafter and throughout this specification are capable of being stored on an article of manufacture to facilitate transporting and transferring such methodologies to computers. The term article of manufacture, as used, is intended to encompass a computer program accessible from any computer-readable device, carrier, or media.

Figure 8:
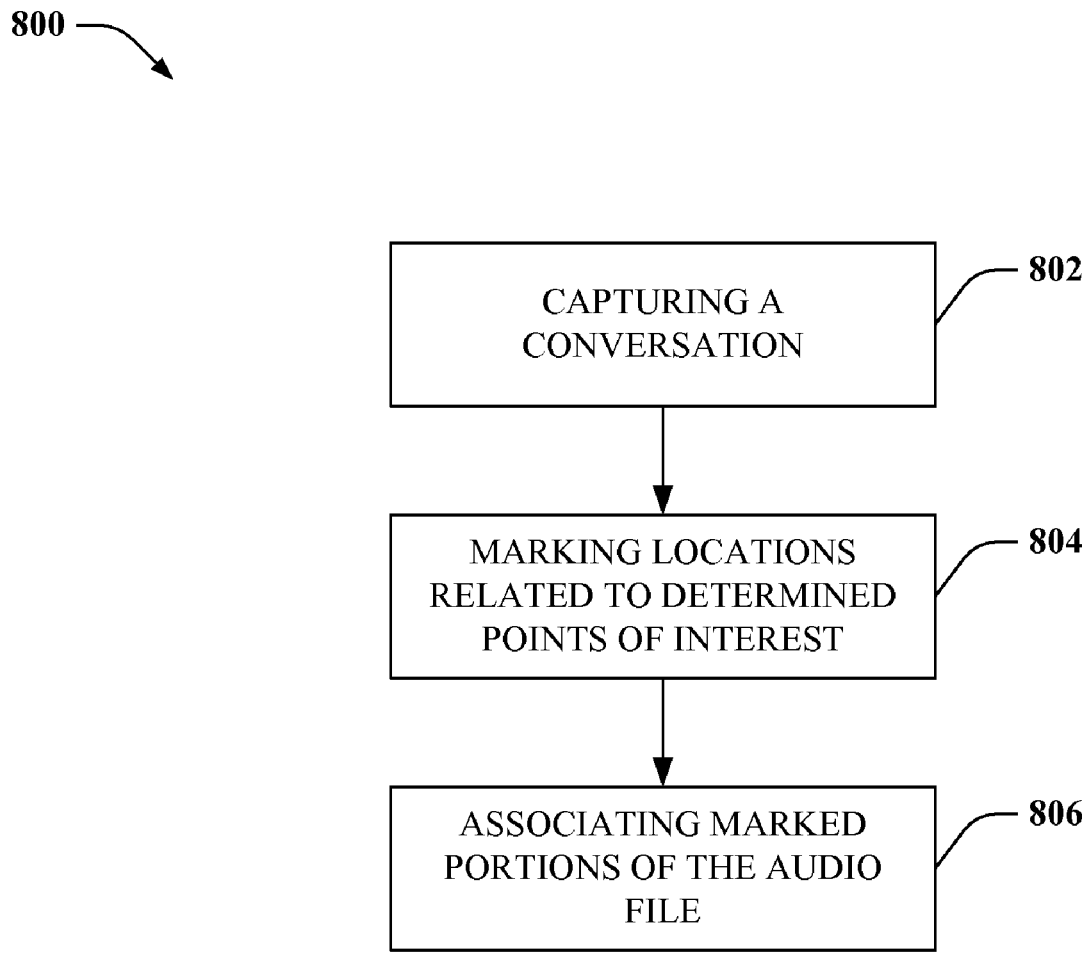
FIG. 8 depicts a sample methodology for identifying and summarizing portions of audio content in accord with the subject disclosure.

Referring to FIG. 8, a sample methodology 800 for identifying and summarizing portions of audio content in accord with the subject disclosure is depicted. At 802, a conversation is captured. Such conversation can be speech by one or more people, an active discussion, a verbal presentation of content, a monologue, dialogue, or the like. Additionally, such conversation can be associated with additional media, such as video media, photographic media, etc. For instance, a dialogue from a movie, related to video portions of the movie, can be captured at 802.

The conversation can be captured at reference number 802 by various media recording devices. For instance, an audio recorder, such as a tape recorder, or digital sound recorder can be utilized; also a video recorder, camcorder or similar device capable of recording sound along with other media types can be utilized. At reference number 804, locations related to determined points of interest can be marked. Such points of interest can be inferred from speaker activity level or indicated as a function of speaker activity. In addition, marking can include metadata that is included with an audio media file, distinguishing a portion of the file related to the point of interest from other portions of the file, or at least from non-marked portions. At 806, marked portions of the audio file are associated with each other. For instance, a digital link can be created between the marked locations to facilitate efficient retrieval and navigation of marked portions of an audio file. As described, methodology 800 can enable summarization and review of audio content related to identified points of interest.

Figure 9:
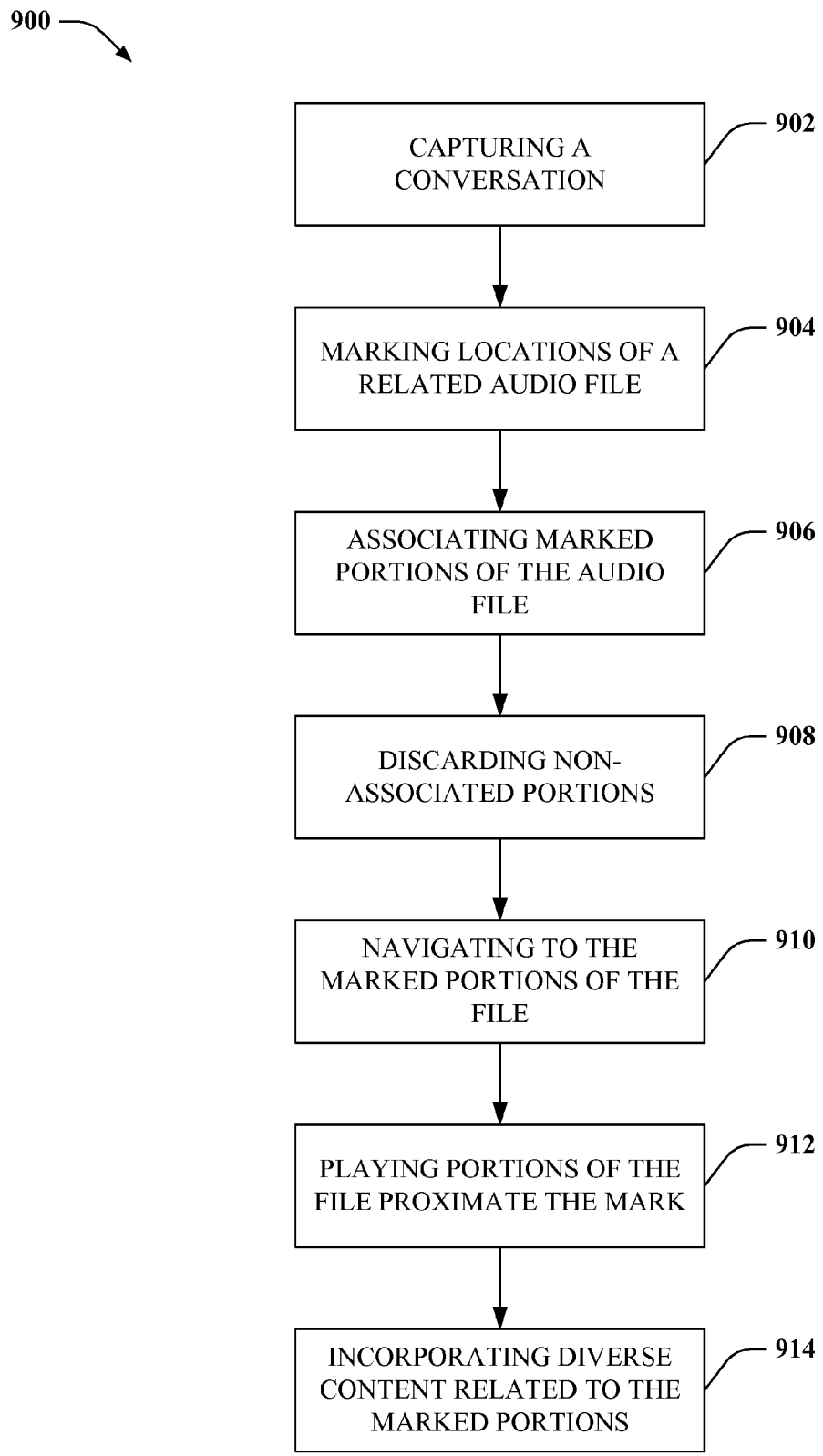
FIG. 9 illustrates an example methodology for creating a diverse summary of audio content in accord with aspects of the claimed subject matter.

FIG. 9 illustrates an example methodology for creating a diverse summary of audio content in accord with aspects of the claimed subject matter. At 902, a conversation can be captured (e.g., in substantially similar fashion as discussed above with respect to FIG. 8). At 904, locations of an audio file related to the conversation can be marked. At 906, the marked portions of the audio file can be associated with each other. At 908, non-associated portions of the audio file can be discarded to create a summary file comprising the marked locations and portions associated thereto. For instance, a parsing mechanism can analyze the audio file and identify portions that are not within a threshold proximity to the locations marked at reference number 904. Such identified portions can then be discarded.

At reference number 910, the marked portions of the audio file can be navigated to. At 912, portions of the audio file proximate a particular mark can be played. At 914, diverse content related to the marked portions of the audio file can be associated and/or incorporated into the summary file. For instance, video or photographic media related to portions of the audio file marked at reference number 904 can also be associated with the summary compiled at reference number 908. In such a manner, methodology 900 can provide a summary of recorded content, including diverse media types, related to marked portions of audio content.

Figure 10:
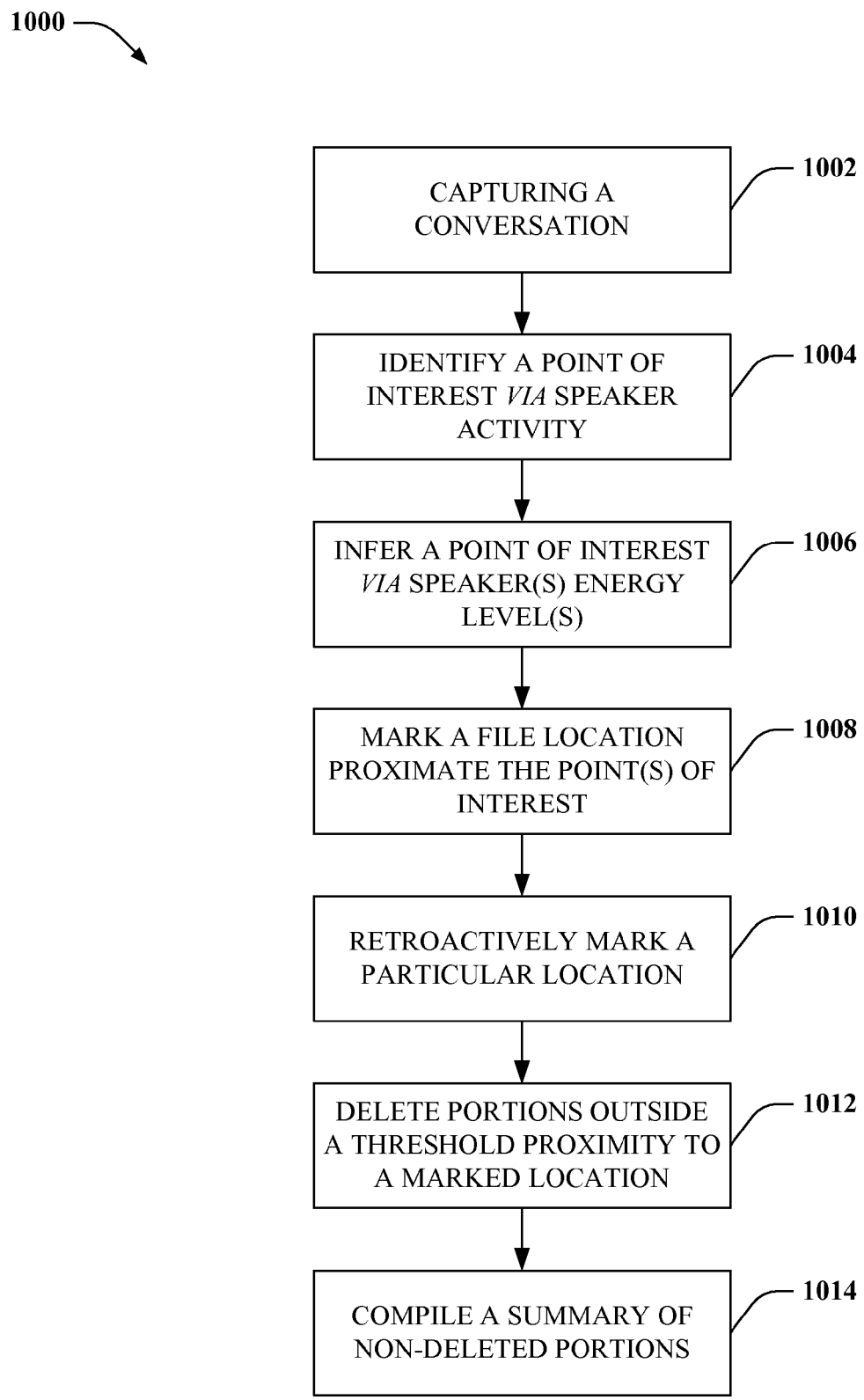
FIG. 10 depicts an exemplary methodology for inferring or indicating points of interest in a conversation for one or more individuals.

FIG. 10 depicts an exemplary methodology 1000 for inferring or indicating points of interest in a conversation for one or more individuals. At 1002, a conversation can be captured. At 1004, a point of interest can be identified from an activity of a speaker. Such activity can include a verbal cue, somatic gesture, pressing of a button of a device, or the like. In addition, the activity can be stored within a user preferences list and associated with the particular user.

At 1006, a point of interest can be inferred from at least an energy level of one or more speakers. For instance, energy level can be determined from auditory indications related to the conversation. A pitch, volume, tone, rate of speech, frequency and length of pauses, or a number of speakers speaking concurrently can all be incorporated into a contemporaneous energy level determination. At 1008, a file location is marked proximate to the identified point(s) of interest. Such markings can be in the form of metadata or other extended information suitable for distinguishing one portion of a file from other portions. In addition, the markings can be particular to a particular speaker, enabling identification of points of interest also particular to the speaker.

At 1010, a particular location in an audio file can be marked retroactively. For example, a speaker can determine that a topic of discussion is of interest two minutes after the topic has begun. In order to capture the beginning of the discussion, the speaker can indicate that a mark should be placed two minutes prior to a contemporaneous point in the file. At 1012, portions of the audio file outside of a threshold proximity to identified points of interest can be deleted. At 1014, a summary of non-deleted portions can be compiled into a single file, preserving only the portions that are of interest to one or more speakers, and preserving memory on a storage device. As described, methodology 1000 can facilitate efficient and pertinent summarization of audio content in accord with aspects of the claimed subject matter.

Figure 11:
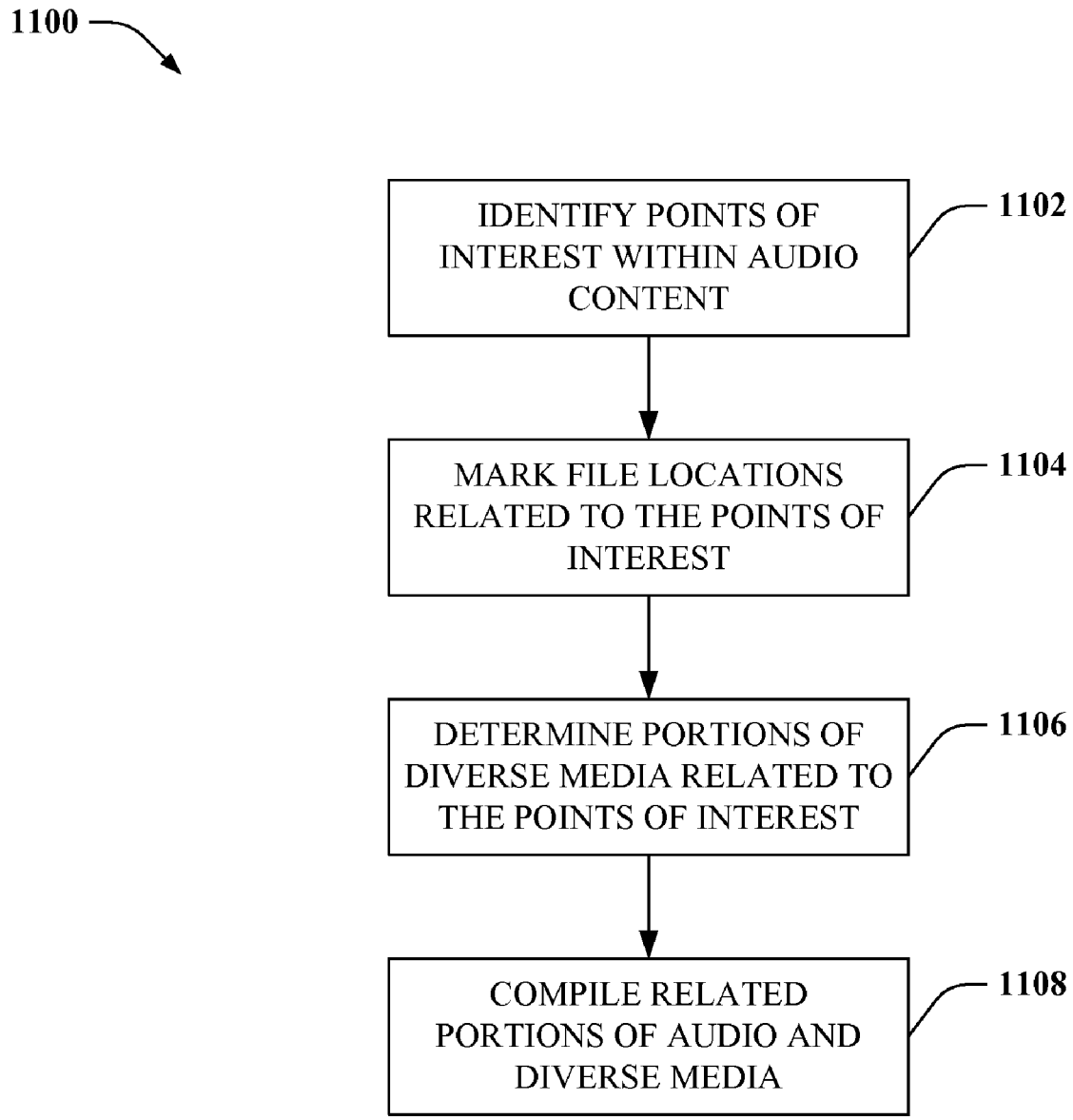
FIG. 11 illustrates an example methodology for compiling a summary of diverse types of media related to points of interest in a conversation, to provide context and association for such summary.

FIG. 11 illustrates an example methodology 1100 for compiling a summary of diverse types of media related to points of interest in a conversation, to provide context and association for such summary. At 1102, points of interest within audio content can be identified. Such identification can be substantially similar to methodologies described herein. At 1104, locations of an audio file related to the identified points of interest can be marked. At 1106, portions of diverse media content related to the identified points of interest can be determined. For instance, a device can search network data stores (e.g., such as the Internet, a private intranet, or other networked information resource) for information related to the marked portions. As a more specific example, portions of the audio file proximate the marked locations can be translated to text, and utilized as search criteria on an online search engine. Search results can be analyzed for relevancy to the marked locations, and if within a threshold relevancy, can be determine as related to marked points of interest.

At 1108, related portions of audio and diverse media can be compiled. For instance, results of a search conducted at reference number 1106 can be downloaded, parsed as necessary, and extracted. The extracted information can be compiled into one or more associated files and linked with the related portions of marked audio content. In such a manner as described, methodology 1100 can facilitate compilation of various points of interest within audio content along with a rich and diverse compilation of content associated thereto.

Figure 12:
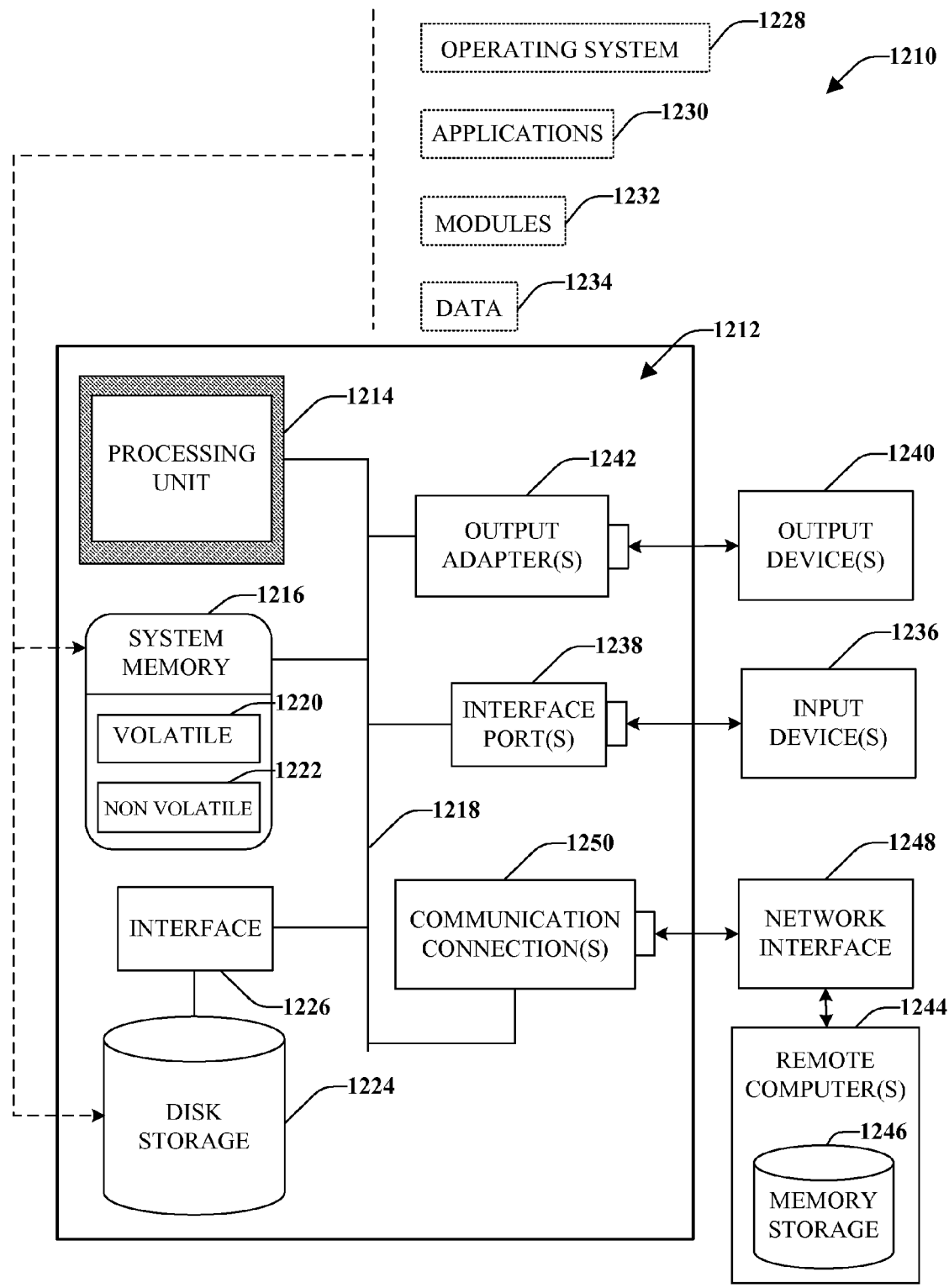
FIG. 12 depicts a sample operating environment related to electronic processing in accord with aspects of the claimed subject matter.
Figure 13:
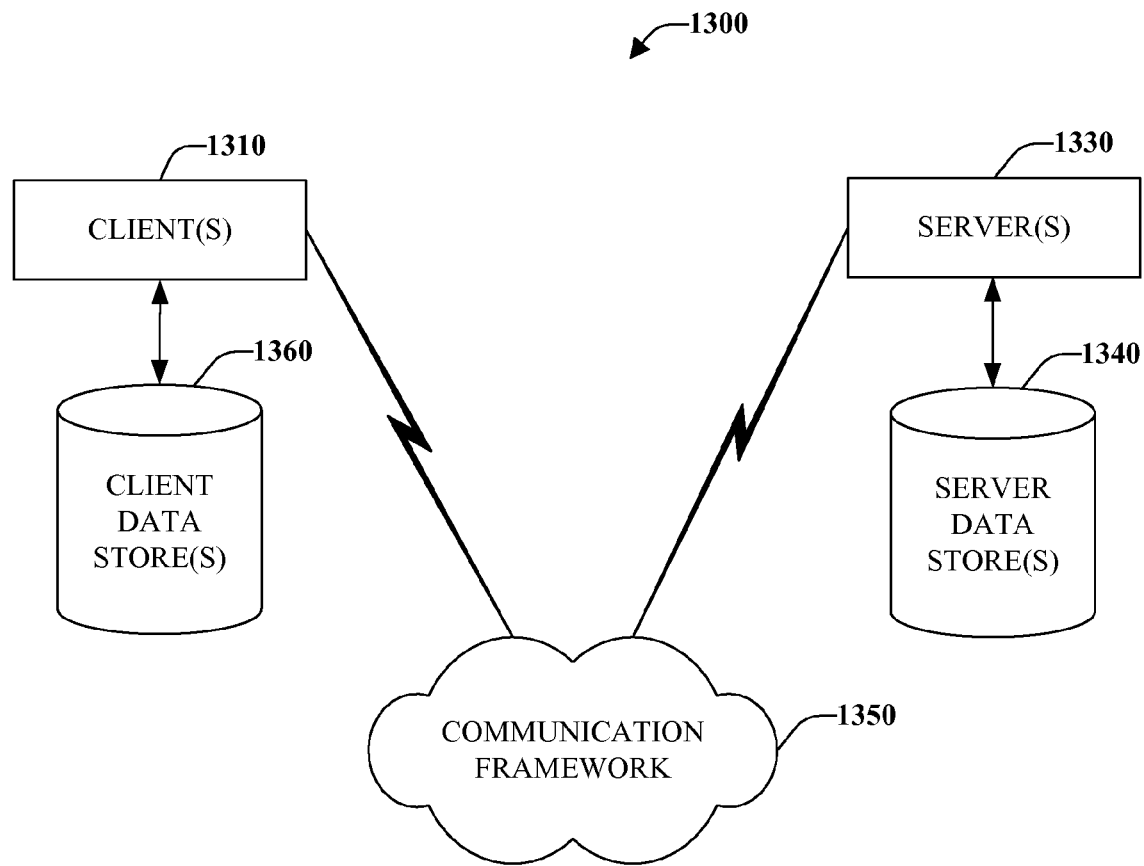
FIG. 13 depicts a sample networking environment for remote communication and data filtering in accord with additional aspects of the subject disclosure.

In order to provide additional context for the various aspects of the disclosed subject matter, FIGS. 12 and 13 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the invention also may be implemented in combination with other program modules.

Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the invention can be practiced on stand-alone computers. In a distributed computing environment, program modules may be located in both local and remote memory storage devices.

With reference to FIG. 12, an exemplary environment 1210 for implementing various aspects disclosed herein includes a computer 1212 (e.g., desktop, laptop, server, hand held, programmable consumer or industrial electronics . . . ). The computer 1212 includes a processing unit 1214, a system memory 1216, and a system bus 1218. The system bus 1218 can couple system components including, but not limited to, the system memory 1216 to the processing unit 1214. The processing unit 1214 can be any of various available microprocessors. Dual microprocessors and other multiprocessor architectures also can be employed as the processing unit 1214.

The system bus 1218 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1216 includes volatile memory 1220 and nonvolatile memory 1222. The basic input/output system (BIOS), containing the basic routines to transfer information between elements within the computer 1212, such as during start-up, is stored in nonvolatile memory 1222. By way of illustration, and not limitation, nonvolatile memory 1222 can include read only memory (ROM), programmable ROM (PROM), electrically programmable ROM (EPROM), electrically erasable ROM (EEPROM), or flash memory. Volatile memory 1220 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1212 also includes removable/non-removable, volatile/non-volatile computer storage media. FIG. 12 illustrates, for example, disk storage 1224. Disk storage 1224 includes, but is not limited to, devices like a magnetic disk drive, floppy disk drive, tape drive, Jaz drive, Zip drive, LS-100 drive, flash memory card, or memory stick. In addition, disk storage 1224 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1224 to the system bus 1218, a removable or non-removable interface is typically used such as interface 1226.

It is to be appreciated that FIG. 12 describes software that acts as an intermediary between users and the basic computer resources described in suitable operating environment 1210. Such software includes an operating system 1228. Operating system 1228, which can be stored on disk storage 1224, acts to control and allocate resources of the computer system 1212. System applications 1230 take advantage of the management of resources by operating system 1228 through program modules 1232 and program data 1234 stored either in system memory 1216 or on disk storage 1224. It is to be appreciated that the present invention can be implemented with various operating systems or combinations of operating systems.

A user enters commands or information into the computer 1212 through input device(s) 1236. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1214 through the system bus 1218 via interface port(s) 1238. Interface port(s) 1238 include, for example, a serial port, a parallel port, a game port, and a universal serial bus (USB). Output device(s) 1240 use some of the same type of ports as input device(s) 1236. Thus, for example, a USB port may be used to provide input to computer 1212 and to output information from computer 1212 to an output device 1240. Output adapter 1242 is provided to illustrate that there are some output devices 1240 like displays (e.g., flat panel and CRT), speakers, and printers, among other output devices 1240 that require special adapters. The output adapters 1242 include, by way of illustration and not limitation, video and sound cards that provide a means of connection between the output device 1240 and the system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. The remote computer(s) 1244 can be a personal computer, a server, a router, a network PC, a workstation, a microprocessor based appliance, a peer device or other common network node and the like, and typically includes many or all of the elements described relative to computer 1212. For purposes of brevity, only a memory storage device 1246 is illustrated with remote computer(s) 1244. Remote computer(s) 1244 is logically connected to computer 1212 through a network interface 1248 and then physically connected via communication connection 1250. Network interface 1248 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit-switching networks like Integrated Services Digital Networks (ISDN) and variations thereon, packet switching networks, and Digital Subscriber Lines (DSL).

Communication connection(s) 1250 refers to the hardware/software employed to connect the network interface 1248 to the bus 1218. While communication connection 1250 is shown for illustrative clarity inside computer 1212, it can also be external to computer 1212. The hardware/software necessary for connection to the network interface 1248 includes, for exemplary purposes only, internal and external technologies such as, modems including regular telephone grade modems, cable modems, power modems and DSL modems, ISDN adapters, and Ethernet cards or components.

FIG. 13 is a schematic block diagram of a sample-computing environment 1300 with which the present invention can interact. The system 1300 includes one or more client(s) 1310. The client(s) 1310 can be hardware and/or software (e.g., threads, processes, computing devices). The system 1300 also includes one or more server(s) 1330. Thus, system 1300 can correspond to a two-tier client server model or a multi-tier model (e.g., client, middle tier server, data server), amongst other models. The server(s) 1330 can also be hardware and/or software (e.g., threads, processes, computing devices). The servers 1330 can house threads to perform transformations by employing the present invention, for example. One possible communication between a client 1310 and a server 1330 may be in the form of a data packet adapted to be transmitted between two or more computer processes.

The system 1300 includes a communication framework 1350 that can be employed to facilitate communications between the client(s) 1310 and the server(s) 1330. The client(s) 1310 are operatively connected to one or more client data store(s) 1360 that can be employed to store information local to the client(s) 1310. Similarly, the server(s) 1330 are operatively connected to one or more server data store(s) 1340 that can be employed to store information local to the servers 1330.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" are used in either the detailed description or the claims, such terms are intended to be inclusive in a manner similar to the term "comprising" as "comprising" is interpreted when employed as a transitional word in a claim.

What is claimed is:

1. A system that facilitates organization of audio media, the system comprising:
a memory, wherein the memory is encoded with instructions;
a processor, wherein the processor executes the instructions;
the instructions being executed comprising:
an inference component that determines a point of interest based at least in part upon identification of an energy level, wherein identification of the energy level occurs in an oral conversation or review of a recording of the oral conversation, wherein the energy level is based at least in part on measurable auditory indications;
an annotation component that marks an audio media file at a location associated with the point of interest; and
a summarization component that generates a summary of the oral conversation by compiling portions of the audio media file that are in a threshold proximity to one or more locations marked by the annotation component, wherein the summarization component automatically determines an appropriate size portion for the threshold proximity as a function of relevancy to each marked point of interest, wherein the appropriate size portion is determined by:
analyzing a first portion of the audio media file within a first proximity to a point of interest by translating the first portion into text and identifying a first set of keywords representative of the first portion of the audio media file;
analyzing a second portion of the audio media file within a second threshold proximity to a point of interest by translating the first portion into text and identifying a second set of keywords representative of the second portion of the audio media file;
comparing relevancy of keywords within the first portion to keywords within the second portion of the audio media file and determining whether relevancy of keywords within the second portion drops below a default relevancy factor, wherein the default relevancy factor is a function of the first set of keywords representative of the first portion of the audio media file; and
selecting the appropriate size portion based on whether relevancy of keywords within the second portion drops below the default relevancy factor.

2. The system of claim 1, comprising a context component that determines at least time and location information related to the oral conversation and associates the information with the audio media file.

3. The system of claim 2, comprising a network search component that provides context related to the oral conversation, including at least in part by interfacing with one or more network data servers and compiling data pertinent to at least the time and location information, as well as data pertaining to time, location, news, weather, or political information, or combinations thereof, pertinent to keywords extracted from the conversation.

4. The system of claim 2, comprising a user input component that stores a user preference file, the user preference file establishes defaults pertinent to determining the point of interest, determining the time and location information, or determining a context related to the oral conversation, or combinations thereof.

5. The system of claim 1, comprising a multi media component that associates diverse content germane to the oral conversation with the audio media file.

6. The system of claim 5, the annotation component marks a file at a location where the diverse content is germane to the point of interest.

7. The system of claim 5, the diverse content includes photographic, video, or textual content, or combinations thereof.

8. The system of claim 1, comprising a navigation component that retrieves a portion of the audio file proximate the marked location.

9. The system of claim 1, comprising a parsing component that discards a portion of the audio media file that is not within a threshold proximity to a marked point of interest.

10. The system of claim 1, the energy level is determined implicitly by a pitch, tone, pause rate, word rate, or volume of a speaker's or a reviewer's voice, or a number of speakers or reviewers speaking concurrently, or explicitly by a predetermined verbal, somatic, or auditory trigger, or press of a button on a device, or combinations thereof.

11. A method for providing a summary of an audio content, comprising:
storing, in a memory, instructions for performing the method of providing a summary of an audio content;
executing the instructions on a processor;
according to the instructions being executed:
capturing at least a portion of an oral conversation in an audio file;
marking the audio file at one or more locations proximate to one or more points of interest, wherein the one or more points of interest are identified via a speaker activity or inferred from a degree of emotion in one or more speakers' voices;
associating portions of the audio file that are within a threshold proximity to at least one point of interest; and
summarizing the oral conversation by compiling portions of the audio media file that are in a threshold proximity to one or more locations marked, wherein summarizing automatically determines an appropriate size portion for the threshold proximity as a function of relevancy to each marked point of interest.

12. The method of claim 11, comprising discarding portions of the audio file that are not within a threshold proximity to at least one point of interest.

13. The method of claim 11, wherein the speaker activity includes a verbal trigger, somatic trigger or press of a button on a device.

14. The method of claim 11, comprising marking the audio file as a result of one or more points of interest identified as points of interest to each sneaker of multiple speakers, wherein a mark associated with one speaker is distinct from a mark associated with another speaker.

15. The method of claim 11, wherein the appropriate size portion is determined by:
analyzing a first portion of the audio file within a first proximity to a point of interest by translating the first portion into text and identifying a first set of keywords representative of the first portion of the audio file;
analyzing a second portion of the audio file within a second threshold proximity to a point of interest by translating the first portion into text and identifying a second set of keywords representative of the second portion of the audio file;

comparing relevancy of keywords within the first portion to keywords within the second portion of the audio file and determining whether relevancy of keywords within the second portion drops below a default relevancy factor, wherein the default relevancy factor is a function of the first set of keywords representative of the first portion of the audio media file; and selecting the appropriate size portion based on whether relevancy of keywords within the second portion drops below the default relevancy factor.

16. A system that facilitates annotation and summarization of auditory objects, the system comprising:

a memory, wherein the memory is encoded with instructions;

a processor, wherein the processor executes the instructions;

the instructions being executed comprising:

means for identifying one or more points of interest within audio content based on a level of emotion of one or more speakers' voices, or based on a predetermined human activity, or combinations thereof;

means for book marking an audio file at one or more locations commensurate with the one or more identified points of interest;

means for correlating the audio file with diverse media related to the audio content, wherein the diverse media includes photographic media, video media, and textual media; and means for book marking one or more diverse media files containing the diverse media at locations commensurate with the one or more points of interest within the audio content.

17. The system of claim 16, further comprising means for compiling a summary of the points of interest across diverse media types by compiling portions of the audio file and portions of the one or more diverse media files within a threshold proximity of the bookmarked locations, into one or more related compilation files.

* * * * *

UNITED STATES PATENT AND TRADEMARK OFFICE
CERTIFICATE OF CORRECTION

| | | |
|---|---|---|
| PATENT NO. | : 7,716,054 B2 | |
| APPLICATION NO. | : 11/771135 | |
| DATED | : May 11, 2010 | |
| INVENTOR(S) | : Jensen M. Harris et al. | |

It is certified that error appears in the above-identified patent and that said Letters Patent is hereby corrected as shown below:

In column 20, line 54, in Claim 14, delete "sneaker" and insert --speaker--, therefor.

Signed and Sealed this
Fifteenth Day of February, 2011

David J. Kappos
*Director of the United States Patent and Trademark Office*